US010061022B2

(12) United States Patent
Guthmann et al.

(10) Patent No.: US 10,061,022 B2
(45) Date of Patent: Aug. 28, 2018

(54) SONAR SYSTEM WITH CURVED ANTENNA OR ANTENNA CONFIGURED TO TRANSMIT THE SAME TRANSMISSION PATTERN AS THE CURVED ANTENNA

(71) Applicant: THALES, Courbevoie (FR)

(72) Inventors: Pierre Guthmann, Brest (FR); Nicolas Mandelert, Ploudalmezeau (FR); Patrick Ferrara, Mougins (FR)

(73) Assignee: THALES, Courbevoie (FR)

( * ) Notice: Subject to any disclaimer, the term of this patent is extended or adjusted under 35 U.S.C. 154(b) by 150 days.

(21) Appl. No.: 14/908,477

(22) PCT Filed: Jul. 24, 2014

(86) PCT No.: PCT/EP2014/065972
§ 371 (c)(1),
(2) Date: Jan. 28, 2016

(87) PCT Pub. No.: WO2015/014723
PCT Pub. Date: Feb. 5, 2015

(65) Prior Publication Data
US 2016/0170012 A1 Jun. 16, 2016

(30) Foreign Application Priority Data
Aug. 2, 2013 (FR) ...................... 13 01864

(51) Int. Cl.
*G01S 7/00* (2006.01)
*G01S 7/524* (2006.01)
(Continued)

(52) U.S. Cl.
CPC .......... *G01S 7/524* (2013.01); *G01S 15/8902* (2013.01); *G10K 11/346* (2013.01); *G10K 11/348* (2013.01)

(58) Field of Classification Search
CPC ...................................................... G01S 7/524
See application file for complete search history.

(56) References Cited

U.S. PATENT DOCUMENTS

| 4,802,148 A | 1/1989 | Gilmour |
| 5,200,931 A * | 4/1993 | Kosalos .............. G01S 7/52003 |
| | | 367/11 |

(Continued)

FOREIGN PATENT DOCUMENTS

| JP | 55-104149 A | 8/1980 |
| JP | 62-235585 A | 10/1987 |

OTHER PUBLICATIONS

Andrea Bellettini et al., "Design and Experimental Results of a 300-kHz Synthetic Aperture Sonar Optimized for Shallow-Water Operations," IEEE Journal of Oceanic Engineering, vol. 34, No. 3, Jul. 2009, pp. 285-293, XP011266896.

(Continued)

*Primary Examiner* — Hovhannes Baghdasaryan
(74) *Attorney, Agent, or Firm* — Baker & Hostetler LLP

(57) ABSTRACT

A sonar system to image the seabed, comprises at least one emission antenna to emit an acoustic beam covering a useful angular sector delimited by a first direction and a second direction, the distance between the antenna and the seabed being more significant in the first direction than in the second direction. The emission device is configured to form an emission pattern whose maximum is situated substantially in the first direction and which decreases from the first direction to the second direction and from the first direction in the sense opposite to the second direction, the energy attenuation being faster in the sense opposite to the second direction than toward the second direction.

19 Claims, 5 Drawing Sheets

(51) Int. Cl.
 *G01S 15/89* (2006.01)
 *G10K 11/34* (2006.01)

(56) References Cited

U.S. PATENT DOCUMENTS

| | | | |
|---|---|---|---|
| 5,546,356 A | 8/1996 | Zehner | |
| 2003/0149357 A1* | 8/2003 | Liu | G01S 7/52028 |
| | | | 600/437 |
| 2003/0206489 A1* | 11/2003 | Preston | G01S 7/52004 |
| | | | 367/88 |
| 2004/0208084 A1 | 10/2004 | Guthmann | |
| 2006/0052699 A1* | 3/2006 | Angelsen | A61B 8/14 |
| | | | 600/437 |
| 2008/0092657 A1* | 4/2008 | Fritsch Yusta | G01S 3/80 |
| | | | 73/596 |
| 2012/0063645 A1* | 3/2012 | Lindholm | G01S 7/6263 |
| | | | 382/106 |

OTHER PUBLICATIONS

English translation of Notice of Rejection issued in Japanese Patent Application No. 2016-530447, dated Jun. 5, 2018.

* cited by examiner

SONAR SYSTEM WITH CURVED ANTENNA OR ANTENNA CONFIGURED TO TRANSMIT THE SAME TRANSMISSION PATTERN AS THE CURVED ANTENNA

CROSS-REFERENCE TO RELATED APPLICATIONS

This application is a National Stage of International patent application PCT/EP2014/065972, filed on Jul. 24, 2014, which claims priority to foreign French patent application No. FR 1301864, filed on Aug. 2, 2013, the disclosures of which are incorporated by reference in their entirety.

FIELD OF THE INVENTION

The field of the invention is that of sonars. The invention pertains more particularly to sonars used for imaging the seabed. The field of application of these sonars relates to the detection of objects by reflection of sound waves on the objects and on the seabed and by processing of the reflected waves.

BACKGROUND

The objects are, for example, mines laid on the seabed. For this application, the sonars comprise an emission antenna emitting an acoustic beam directed toward the seabed covering a useful angular sector starting from the antenna and delimited by two directions inclined with respect to the horizontal and to the vertical. The useful angular sector delimits the zone of the seabed that the sonar is intended to image. Stated otherwise, the sonar is intended to image the seabed zone intercepted by the angular sector.

These sonars are usually mounted on a submersible carrier such as a towed or autonomous underwater craft or under the hull of a surface vessel.

Contemporary emitting antennas are cylindrical antennas or plane antennas. These antennas exhibit an emission pattern comprising a main lobe and sidelobes, the emission pattern being symmetric with respect to the maximum of the main lobe. For example, plane antennas exhibit a sin x/x emission pattern. The antennas are usually configured in such a way that the maximum of energy is emitted between the first and the second direction, that is to say within the useful angular sector.

These antennas consume significant energy. Now, mine hunting is steering toward autonomous craft for the search for mines. A significant point in the performance of a sonar embedded aboard an autonomous craft is its low energy consumption.

It is noted moreover that these antennas exhibit limited performance by creating multiple paths toward the surface, notably in shallow waters (typically less than 30 m).

SUMMARY OF THE INVENTION

The aim of the invention is to alleviate at least one of these drawbacks.

For this purpose, the subject of the invention is a sonar system intended to image the seabed, comprising at least one emission antenna intended to emit an acoustic beam covering a useful angular sector delimited by a first direction and a second direction, the distance between the antenna and the seabed being more significant in the first direction than in the second direction. According to the invention, the antenna is configured so as to form an emission pattern whose maximum is situated substantially in the first direction and decreases from the first direction to the second direction and from the first direction in the sense opposite to the second direction, the energy attenuation being faster in the sense opposite to the second direction than toward the second direction.

Such a sonar system exhibits greater autonomy than prior art sonars since it makes it possible to decrease the sound energy dispatched by the emission antenna to image the seabed. The sound energy dispatched by an antenna being directly related to the electrical power necessary to feed the antenna, the invention makes it possible to produce sonar systems which consume little energy. If the emitting antenna is carried by an autonomous underwater craft, the autonomy of the latter is greater.

Moreover the size of the antenna being directly related to the sound energy that it must emit, the sonar according to the invention requires an emission antenna of lesser size than the prior art antennas. Stated otherwise, the sonar system according to the invention makes it possible to reduce the size of the antenna without degrading its performance. Integration of the sonar system on carriers is thus facilitated.

These advantages are related to the fact that the medium (water for example) in which the sound wave propagates attenuates this wave. Now, the sound wave will traverse a longer path in order to strike the seabed in the first direction than in the second direction. Consequently, the acoustic energy necessary to image the seabed in the first direction is more significant than the energy necessary to image the seabed in the second direction.

In the prior art systems, the emission antenna emitted maximum energy between the first and second directions. So as to dispatch sufficient sound energy in the first direction, a surplus of energy was therefore dispatched in the other directions. The configuration of the emission antenna according to the invention makes it possible, by dispatching maximum energy in the first direction, to limit the surplus of energy dispatched in the other directions of the useful sector. The maximum of energy is dispatched just where the need is a maximum, that is to say in the direction of maximum range.

Moreover, the sound energy dispatched outside of the useful angular sector, notably beyond the first direction not serving to image the seabed, is lost sound energy. The fact of configuring an antenna in such a way that it generates an emission pattern that decreases more quickly from the first direction and in the sense opposite to the second direction, than between the first and the second direction, makes it possible to limit the sound energy emitted and avoids needless consumption of energy.

Finally, the sound energy emitted beyond a horizontal direction reverberates at the surface of the water, thereby introducing noise into the images obtained by the sonar system. The emission pattern according to the invention makes it possible to limit the noise in the sonar images and thus to provide sonar images of good quality, in particular in shallow waters.

Advantageously, the emission pattern is such that for each direction lying between a third direction, lying between the first direction and the second direction, and the second direction, the energy attenuation, with respect to the energy emitted in the first direction, is substantially equal to the attenuation of the sound energy necessary to image a plane ideal seabed in this direction with respect to the sound energy necessary to image the ideal seabed in the first direction.

Advantageously, the third direction is a direction for which the attenuation is 3 dB, the angle formed between the third direction and the first direction being less than 3 degrees.

Advantageously, the emission antenna comprises an emitting surface comprising a variable radius of curvature, so as to form said emission pattern.

Advantageously, the emitting surface is curved.

Advantageously, the radius of curvature of the emitting surface increases with the distance separating the point considered of the emitting surface from the ideal seabed along a direction perpendicular to the ideal seabed.

Advantageously, the curve formed by the emitting surface in a sectional plane of the antenna perpendicular to its longitudinal axis is formed by a single transducer.

Advantageously, the antenna comprises an emitting surface forming a curve in a sectional plane of the antenna perpendicular to its longitudinal axis, said curve being formed by a plurality of transducers, said antenna comprising a power feed device feeding the respective transducers with one and the same signal imbued with respective phase shifts and/or amplitude modulation so as to form said emission pattern.

Advantageously, the emitting surface is plane or cylindrical.

Advantageously, the pointing of said emission antenna can be offset in terms of bearing.

Advantageously, the system comprises a carrier, the emission antenna being installed on the carrier.

Advantageously, the emission antenna is arranged in such a way that its emitting surface extends longitudinally along an axis parallel to the direction of displacement of the carrier.

Advantageously, the system comprises two emission antennas fixed to port and to starboard of the carrier.

Advantageously, the first direction is the direction of maximum range of the sonar system and the second direction is the direction of minimum range of the sonar system.

BRIEF DESCRIPTION OF THE DRAWINGS

Other characteristics and advantages of the invention will become apparent on reading the detailed description which follows, given by way of nonlimiting example and with reference to the appended drawings in which.

From figure to figure, the same elements are labeled by the same references.

DETAILED DESCRIPTION

Figure 1:
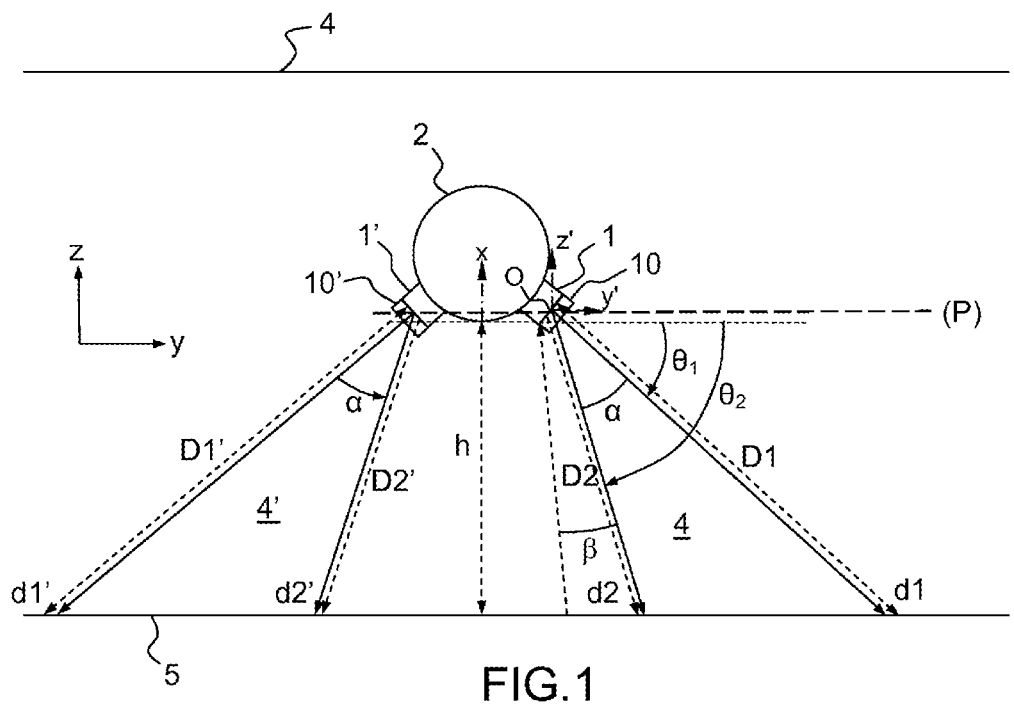
FIG. 1 schematically represents in section in a plane y, z, a sonar system according to the invention, FIG. 2 schematically represents a side view of the system of FIG. 1, FIG. 3 schematically represents an exemplary emission pattern according to the invention, FIG. 4 schematically represents an emission antenna according to a first embodiment of the invention, FIG. 5 schematically represents a profile of the antenna of FIG. 4, FIG. 6 schematically represents an emission antenna emitting acoustic waves according to a second embodiment of the invention.
Figure 2:
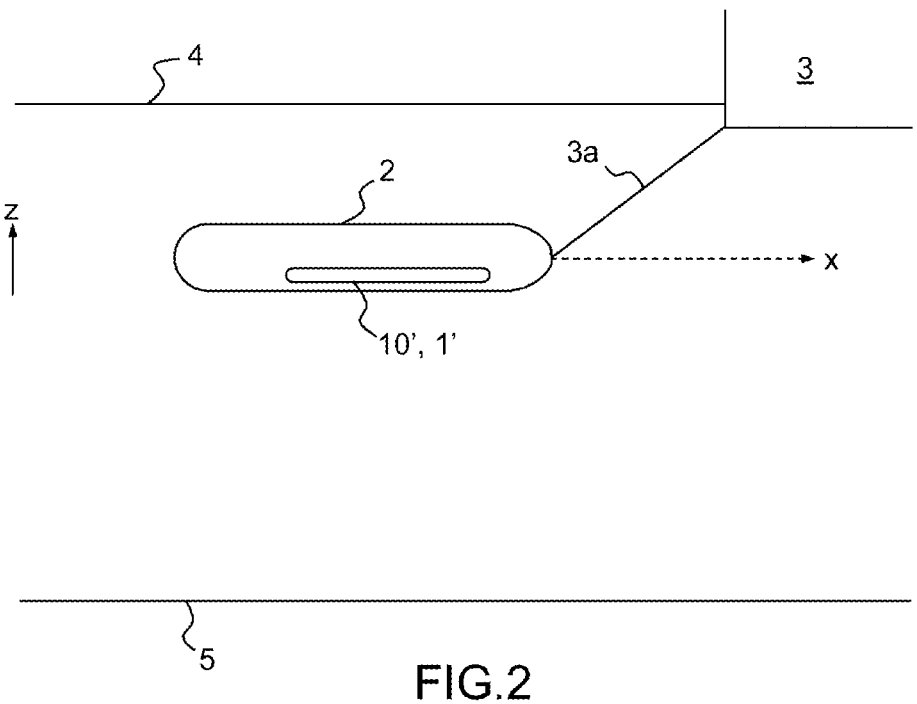

FIGS. 1 and 2 represent a sonar system intended to image the seabed 5. This device comprises two side-looking sonars 1, 1' mounted on a submersible carrier 2 navigating under the surface 4 of the water. The carrier 2 is an underwater craft towed by a surface vessel 3 by means of a cable 3a. As a variant, the carrier can be an autonomous underwater craft, or the submerged bottom of a surface vessel. The sonar system can also comprise at least one emission antenna towed by the carrier. The carrier 2 is configured so as to navigate along a direction x of advance. It is preferably intended to navigate at a constant altitude relative to the seabed 5.

The sonar system comprises two sonars 1, 1' each comprising an emission antenna 10, 10'. The underwater craft is advantageously configured in such a way that when it navigates at a fixed height relative to the seabed, the emission antennas 10, 10' are situated at a fixed height h relative to the seabed.

The sonars are disposed to port and to starboard of the carrier. Each emission antenna is configured and positioned so as to emit an acoustic beam, in the direction of the seabed 5. More precisely, each emission antenna 10, 10' is configured and positioned so as to cover a useful angular sector 4, 4' exhibiting an angular aperture a delimited by a first direction d1, d1' and a second direction d2, d2' starting from the corresponding emission antenna and which are oriented toward the seabed. Stated otherwise, each antenna is configured so as to emit an acoustic beam which will cover the useful angular sector allotted to it, that is to say will extend at least over the entire angular aperture α delimited by straight lines d1 and d2 or d1' and d2'. The antenna is positioned on the carrier and optionally configured in such a way that the beam in the useful zone is directed toward the seabed 5.

Advantageously, the directions d1, d2 and d1', d2' are inclined with respect to a direction linking the antenna and an ideal seabed, this direction being perpendicular to the ideal seabed. The directions d1, d2 and d1', d2' are situated in a quarter plane delimited by this direction and the ideal seabed.

The useful angular sector 4, 4' delimits the seabed zone which is imaged by the sonar 1, 1'. The first distance D1, D1' separating the antenna 10, 10' from the seabed in the direction d1, d1' is more significant than the second distance D2, D2' separating the antenna in the second direction d2, d2'.

The first distance D1, D1' is the maximum range of the corresponding sonar 1, 1'. This is advantageously the maximum range of the sonar, or detection range of the sonar, for the mission considered corresponding to the maximum distance that must separate the antenna from the seabed in order for the sonar to be able to image it. Stated otherwise, the first direction d1, d1' is the direction of maximum range of the sonar. This is the direction in which the distance between the seabed and the sonar is a maximum in the useful sector imaged by the sonar. The second direction d2, d2' is the direction of minimum range of the sonar. This is the direction in which the distance separating the sonar from the seabed is a minimum in the useful sector. The distance D2, D2' is the minimum range of the sonar. To summarize, the directions d1 and d2 and respectively d1', d2' delimit respective useful sectors of the sonar, that is to say the sectors actually imaged by the sonar.

The angular aperture a of the useful sector is typically between 10° and 90°. Conventionally, side-looking sonars radiate beams which are extremely fine in terms of bearing. Stated otherwise, the bearing-wise aperture is lower than the elevation-wise aperture.

In the embodiment of FIGS. 1 and 2, the directions d1 and d2 (and d1', d2') lie in the plane (y,z) perpendicular to the direction x of advance of the carrier 2. The direction y is a horizontal direction perpendicular to the direction of advance x. The direction z is a vertical direction. The vertical direction is the direction perpendicular to the horizontal plane formed by the seabed 5.

The first angle θ1 and the second angle θ2 are the angles formed between a horizontal plane P passing through the antenna 10 and the respective directions d1 and d2. They are called angle of elevation. These angles are defined, for a given altitude h of the carrier 2 relative to the seabed, in such a way that the useful sector covers a predefined swath F. The swath F is the horizontal distance separating the directions d1 and d2 on the seabed 5. This distance is, in the embodiment of the figure, calculated perpendicularly to the direction of advance x of the carrier 2. These angles θ1 and θ2 are non-zero and negative. The absolute value of θ1 is less than that of θ2.

Hereinafter in the text and for greater clarity, we now give consideration to the first antenna 10 alone, and not to the second antenna 10', the latter's emission pattern being the same as that of the first antenna 10 but defined with respect to the directions d1' and d2'.

Figure 3:
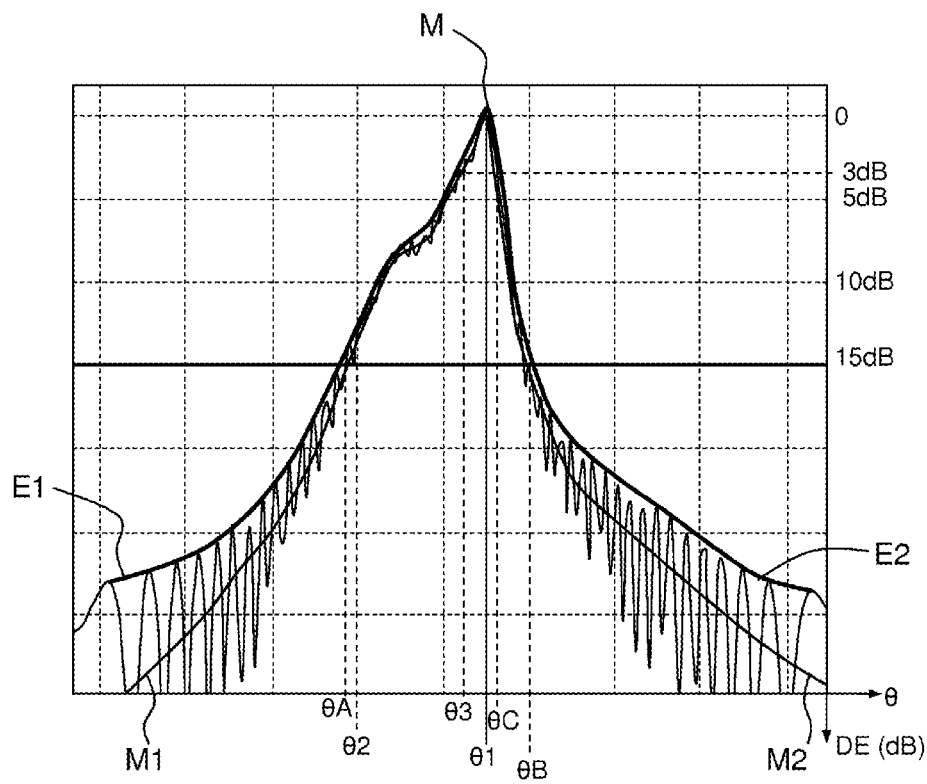

FIG. 3 represents an exemplary emission pattern of the antenna 10. Here the angle according to which the emission pattern varies is the angle of elevation θ.

The abscissa axis represents the axis of the angles of elevation θ between the horizontal plane P parallel to the ideal seabed passing through the antenna and the directions starting from the antenna 10. The point O from which the directions d1 and d2 depart is a point situated behind the emitting or emissive surface of the antenna 10. The horizontal plane P passes through this point. The angle of elevation θ of a direction is reckoned negatively when it is directed toward a point situated below the horizontal plane P. The ordinate axis corresponds to the attenuation DE in decibels (dB) with respect to the maximum of the directivity pattern.

According to an essential characteristic of the invention, the emission antenna 10 is configured and arranged so as to form an emission pattern whose maximum M is situated substantially in the first direction d1, that is to say at the level of the first angle of elevation θ1, and decreases from the first direction d1 to the second direction d2 and from the first direction in the direction opposite to the second direction d2. This pattern comprises a single maximum with a 0 dB attenuation. Stated otherwise, the antenna emits the maximum energy in one direction only. It is an absolute maximum.

This direction is substantially the direction d1. By substantially is meant that the direction in which the antenna emits the most energy has an angle of elevation equal to included in the interval [θ1−0.5°; θ1+0.5°].

The emission pattern oscillates, from the direction d1 up to the direction d2 and from the direction d1 up to the horizontal, around mean curves M1, M2 which decrease in a substantially monotonic manner in these two senses. Stated otherwise, the envelopes E1, E2 linking the local maxima of the emission pattern on either side of the absolute maximum M are curves which decrease in a substantially monotonic manner.

The energy attenuation is faster, from the first direction d1, in the sense opposite to the second direction d2 than toward the second direction d2. Stated otherwise, the mean slope of the mean curve or of the envelope defined hereinabove is less significant on the side of the second direction d2 than on the other side of the first direction d1.

We saw previously that this characteristic makes it possible to achieve energy savings and to limit the degradation of sonar images. It does indeed maximize the sound energy emitted in the useful angular sector and minimizes the sound energy emitted outside of this sector, notably toward the higher angles of elevation.

Advantageously, the emission pattern of the antenna is such that for each direction lying between the second d2 and a direction d3 lying between d1 and d2 and for which the attenuation is substantially equal to 3 dB, the energy attenuation, with respect to the maximum of energy M dispatched in the direction of maximum emission d1, is substantially equal to the attenuation of the sound energy necessary to image a plane ideal seabed in this direction with respect to the sound energy necessary to image the ideal seabed in the first direction d1. By the fact that the attenuation is substantially equal to 3 dB along d3 is meant that d3 is the direction closest to d1 (between d1 and d2) for which the attenuation is equal to 3 dB or else this may be the direction (between d1 and d2) for which the first mean curve M1 is equal to 3 dB.

This signifies that in the advantageous embodiment in which the emission antenna emits, in the first direction d1, sound energy substantially equal to the energy necessary and sufficient to image the seabed along this direction, the sound energy emitted in each direction lying between the directions d3 and d2 is substantially equal to the energy necessary and sufficient to image the seabed along this direction.

The energy necessary to image the seabed as a function of the observation distance d, that is to say the distance separating the emitting antenna and the seabed, with respect to the energy necessary at an initial distance $d_0$ varies as a first approximation according to the following logarithmic law:

$$E(d) = E(d_0) + 40 \log d \quad\quad 1$$

The ideal seabed being substantially parallel to the horizontal plane P, the emission pattern therefore exhibits for the elevation angles θ of each direction lying between the directions d3 and d2, that is to say between the angles of elevation θ3 and θ2, a value substantially equal to:

$$DE(\theta) = 40 \log\left(\frac{\sin\theta_1}{\sin\theta}\right) \quad\quad 2$$

This configuration is optimal in terms of energy dispatched into the useful sector since the energy dispatched onto the ideal seabed is neither more nor less than the energy necessary and sufficient to image the ideal seabed in each direction lying between the third direction and the second direction. Stated otherwise, at each point of the ideal seabed intercepting the beam emitted by the antenna, the energy attenuation is exactly compensated by the shape of the emission pattern.

The fact that the emission pattern is such that for each direction between d3 and d2, that is to say for each angle of elevation situated between θ3 and θ2, the energy attenuation substantially compensates the attenuation of the sound energy necessary to image a plane ideal seabed in this direction with respect to the sound energy necessary to image the ideal seabed in the direction d1, is understood to mean that:

for each direction included in a first zone of the emission pattern lying between θ3 and θ2, in which the attenuation defined by equation 2 is at least equal to 3 dB (decibels), the attenuation of the emission pattern is at least equal to that defined by equation 2 and is greater than the attenuation defined by equation 2 by at most 15 dB.

Moreover, the angle formed between θ3 and θ1 is less than 3 degrees.

Advantageously, beyond a first intermediate angle θA and a second intermediate angle θB, with respect to the direction d1, the attenuation is at least equal to 15 dB. The direction of angle θA is situated beyond the direction d2 with respect to the direction d1 and the direction of angle θB is situated on the other side of the direction d2 with respect to the direction d1. The angles which are situated beyond θA and θB with respect to d1 are the angles which are situated beyond θA when, starting from d1, one heads in the sense from d1 toward d2 and respectively the angles which are situated beyond θB when, starting from d1, one heads in the sense from d2 toward d1. The absolute value of the difference between θB and θ1 is less than the absolute value of the difference between θA and θ1 and preferably less than the absolute value between θ2 and θ1.

A third intermediate angle θC is defined, situated on the other side of θ1 with respect to θ2 and for which the attenuation is substantially equal to 3 dB. The absolute value of the difference between θC and θ1 is less than the absolute value of the difference between θ3 and θ1.

Figure 4:
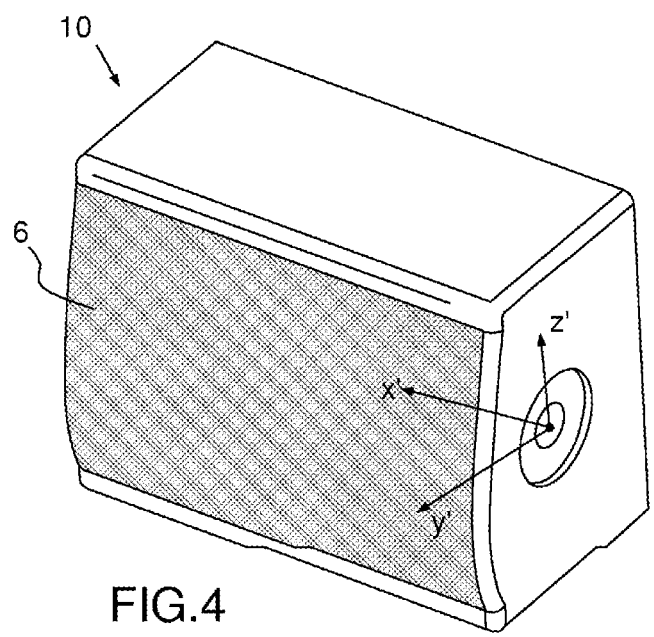

In a first embodiment represented in the example of FIG. 4, the desired emission pattern is obtained by means of an emission antenna 10 comprising an emitting surface 6 whose radius of curvature is variable. The curvature of the emitting surface of the antenna is tailored, by the person skilled in the art, so as to obtain the desired emission pattern. The emitting surface may exhibit sharp angles separating curved parts. Preferably, as visible in FIG. 4, the emitting surface 6 is a curved surface. By curved surface is meant a bowed surface, that is to say a surface whose radius of curvature varies without forming an angle. By angle is meant the figure formed by the intersection of several planes. Stated otherwise, the curved surface does not comprise any salient or re-entrant angle, that is to say that it is devoid of angular points. This type of surface is easier to produce.

An orthogonal frame (x', y', z') tied to the antenna is defined. The axis x' is the longitudinal axis along which the emitting surface extends longitudinally. The origin O of the frame is positioned behind the emitting surface in the direction of emission of the surface from where the directions d1 and d2 depart. The antenna is configured in the frame O, x', y', z' bound to the antenna, when considering that the plane x',y' is a plane intended to form a plane parallel to the seabed and with respect to which the angles of elevation are defined and in such a way that the plane y', z' is the plane in which the directions d1 and d2 are defined. The angle of elevation of d1 is greater than the angle of elevation of d2. The curvature of the antenna is defined for a predetermined mission defining the angles θ1 and θ2.

The antenna is thereafter mounted on a carrier in such a way that the plane x', y' is parallel to the sea plane 5 and in such a way that the plane x', z' is the plane in which one wishes to define the directions d1 and d2. In the embodiment of FIG. 1, the antenna is positioned in such a way that the axis x' is parallel to the axis x and that the axes y' and z' are parallel to the axis y and to the axis z.

The emitting surface 6 exhibits a profile comprising a variable curvature. Stated otherwise, the curve formed by the emitting surface in the sectional plane exhibits a variable curvature. Stated otherwise, the radius of curvature varies according to the curvilinear abscissa on this curve.

The antenna 10 is configured and arranged in such a way that the radius of curvature of the profile of the emitting surface 6 increases when traversing the emissive surface in the sense from d1 toward d2. Thus the radius of curvature of the profile of the emitting surface 6 increases with the angle of elevation of the point considered on the profile, that is to say with the angle of elevation of the point of the emitting surface at the curvilinear abscissa of the point considered of the emitting surface. The altitude of the point considered in a terrestrial reference frame varies as the angle of elevation of the point considered. Stated otherwise, more generally the antenna is arranged and configured in such a way that the radius of curvature of its emitting surface increases with the distance separating the point considered of the antenna from the ideal seabed in a direction perpendicular to the ideal seabed. The radius of curvature of the antenna is thus more significant for emissions corresponding to a distant bed than for the directions corresponding to a close bed.

In the embodiment of FIG. 4, the antenna exhibits a uniform profile over the whole of the length of the antenna. As a variant, the profile of the antenna varies along the longitudinal axis of the antenna.

In the example represented in FIG. 4, the emitting surface 6 consists of a single transducer. Stated otherwise, the curve formed by the profile of the emitting surface belongs to a single transducer.

Figure 5:
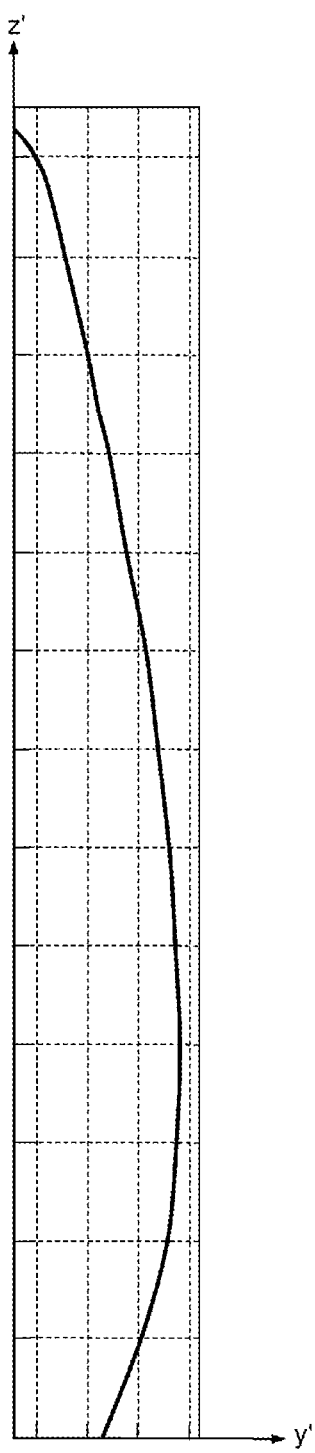

FIG. 5 represents the profile of the emitting surface in the plane y', z'. It is indeed seen that the emitting surface is curved, that its radius of curvature is variable in this plane and that it increases along the axis z'.

Figure 6:
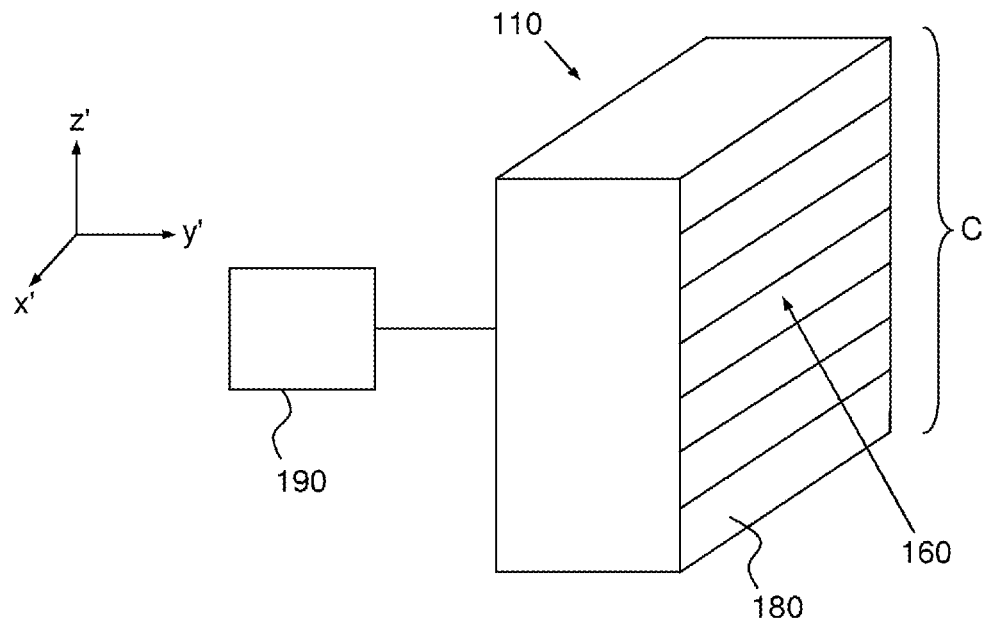

In a second embodiment represented in FIG. 6, the emitting antenna 110 exhibits an emitting surface 160 of predetermined shape. This antenna would not make it possible to obtain the desired directivity pattern if it were formed of a single transducer or of a plurality of transducers fed by means of the same signal. Here the antenna 110 is plane, stated otherwise its emitting surface 160 is plane. As a variant, its emitting surface could be cylindrical or exhibit some other shape.

The curve formed by the emitting surface 160 in a cross section of the antenna in a plane perpendicular to the longitudinal axis of the antenna is formed by a plurality of transducers 180. Stated otherwise, the profile of the antenna is a curve formed by a plurality of transducers 180. This curve is a straight line in the case of a plane antenna and a portion of circle or a circle in the case of a cylindrical antenna. These transducers 180 form a column C along the axis z'.

According to the invention, the transducers 180 of the column of transducers are fed by a power feed device 190. This power feed device 190 is configured so as to feed the transducers 180 with one and the same signal imbued with respective delays and/or amplitude modulations chosen in such a way that the antenna 110 exhibits the desired emission pattern such as defined previously. Stated otherwise, the delays and/or amplitude modulations are chosen in such a way that the antenna 110 exhibits an emission pattern identical to a curved antenna such as described previously. A plane or cylindrical antenna is easier to fabricate than an antenna with curvature variable according to the first embodiment.

Advantageously, the antenna pointing can be offset in terms of bearing, that is to say, in a plane perpendicular to the plane formed by the directions d1 and d2. For this purpose, whether it be for the first embodiment or the second embodiment, the antenna comprises a plurality of columns of at least one transducer that are distributed in a direction perpendicular to the plane formed by the directions d1 and d2, that is to say in the longitudinal direction of the antenna, and the power feed device is configured so as to feed the transducer columns with a signal imbued with other respective phase shifts and/or by other amplitude modulations depending on the position of the column of transducers in the direction perpendicular to the plane formed by the directions d1 and d2.

Figure 7:
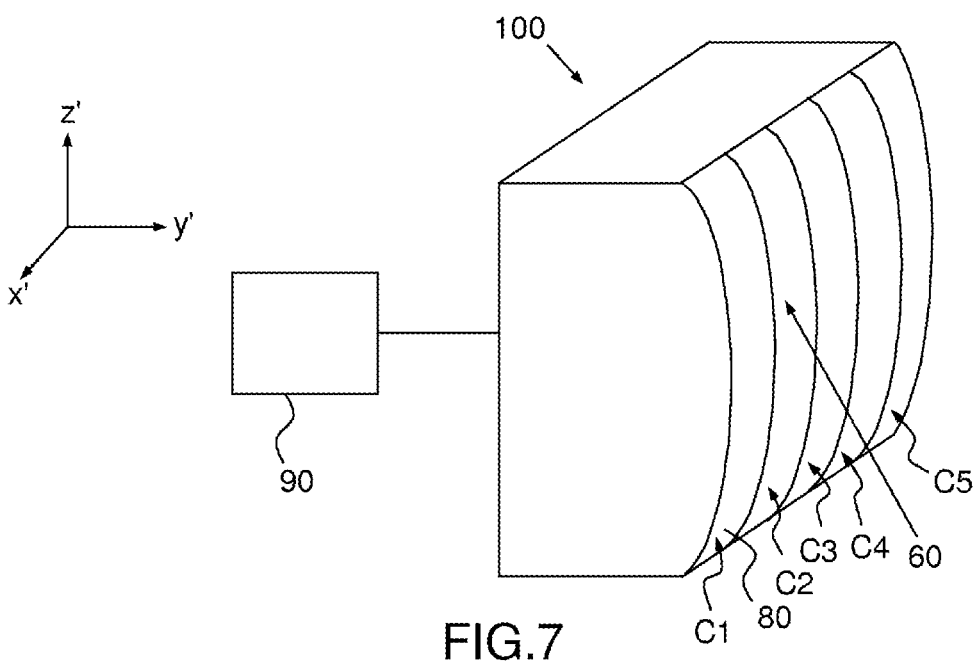
FIG. 7 represents a variant of the antenna of FIGS. 4 and 5, FIG. 8 schematically represents a variant of the antenna according to the second embodiment.

FIG. 7 represents an example of this type of antenna according to the first embodiment. The antenna 100 comprises a plurality of columns Ci of a transducer 80 which are distributed in the direction x'. These transducers 80 each form a column Ci with i=1 to 5 in the direction z'. Moreover, the antenna comprises a power feed device 90 configured so as to feed these transducers 80 by means of a single signal or of respective signals arising from one and the same signal imbued with respective delays and/or amplitude modulations chosen so as to obtain a given direction of pointing in terms of bearing. In this variant, the curve formed by the profile of the emitting surface belongs to a single transducer. Stated otherwise, the curve formed by the emitting surface, in a sectional plane of the antenna perpendicular to its longitudinal axis, is formed by a single transducer. In a variant of the first embodiment, the columns C could consist of a plurality of transducers fed by one and the same signal. Antennas with variable curvature are economical in the sense that they require only one power feed to feed a column of transducers or the single transducer forming the column. The control of these transducers by a single signal or the control of a single transducer so as to form the desired emission pattern is not very complex and efficacious.

Figure 8:
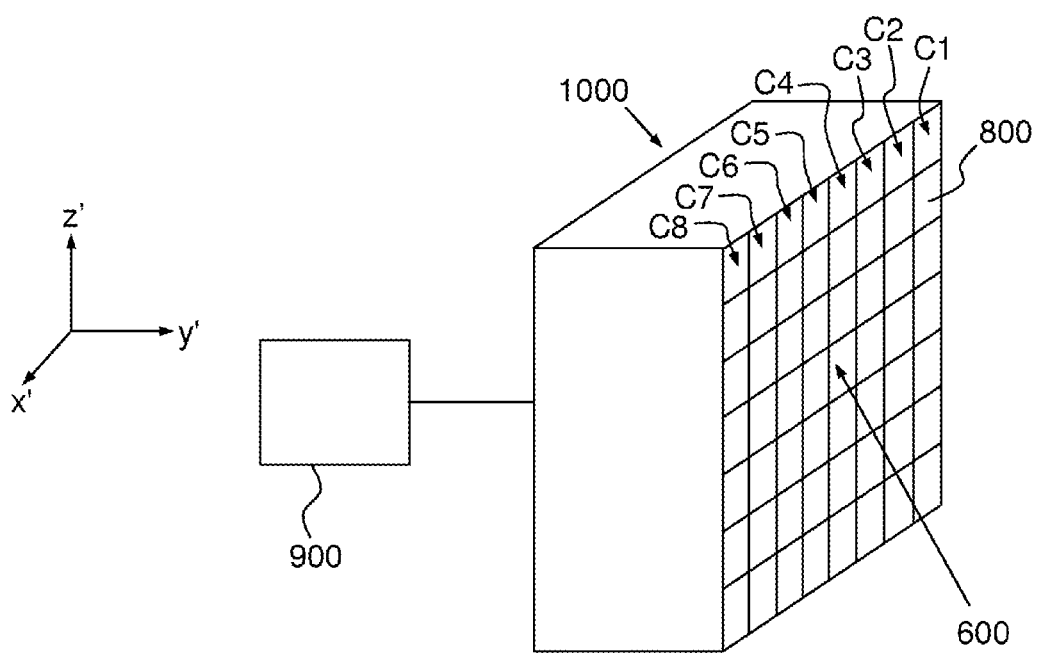

An exemplary antenna according to the second embodiment is represented in FIG. 8. In this embodiment, the antenna 1000 exhibits a plane emitting face 600 comprising a plurality of columns Ci with i=1 to 8 of transducers 800, distributed in the direction x'.

The sonar system described previously comprises several emission antennas but could comprise just one.

In the sonar system of FIGS. 1 and 2, the antennas are arranged in such a way that the emitting surfaces 6 extend parallel to the direction of displacement of the carrier. These are side-looking sonars. As a variant, the sonar system comprises at least one emission antenna comprising an emitting surface perpendicular to the direction of advance of the carrier. This is then a forward-looking sonar. In this case, the plane formed by the directions d1 and d2 is the plane (x,z) with the modifications in the arrangement of the emission antenna that this involves. The antenna is then advantageously disposed in such a way that its longitudinal axis x' is parallel to the axis y, that the axis z' is parallel to the axis z and that the axis y' is parallel to the axis x.

The invention also pertains to a sonar system comprising the carrier and an emitting antenna according to the invention.

The invention claimed is:

1. A sonar system to image the seabed, the sonar system comprising:
at least one emission antenna to emit an acoustic beam directed toward the seabed covering a useful angular sector starting from the antenna and delimited by a first direction and a second direction inclined with respect to the horizontal and the vertical, the first direction forming a first angle with the horizontal smaller than a second angle formed between the second direction and the horizontal, wherein the emission antenna is configured to form an emission pattern with energy emitted by the emission antenna in each direction of the useful ideal sector, and the emitted energy decreases from the first direction to the second direction, wherein a portion of the useful angular sector is delimited by the second direction and a third direction lying between the first direction and the second direction, an ideal emission pattern comprising, in each direction of the portion of the useful angular sector, an ideal attenuation DE of $$DE(\theta) = 40\log\left(\frac{\sin\theta_1}{\sin\theta}\right)$$

where θ is an angle formed between the direction and the horizontal and $\theta_1$ is the first angle, wherein the emission antenna comprises an emitting surface exhibiting a profile in a plane perpendicular to a reference plane formed by the first direction and the second direction, the profile having a curve with a radius of curvature that varies along a curvilinear abscissa, such that the emission pattern of the emission antenna in each direction θ of the useful angular sector exhibits an energy attenuation with respect to energy emitted along the first direction which is equal or superior to the ideal attenuation, the ideal attenuation being at least 3 dB and at most 15 dB.

2. The sonar system of claim 1, wherein the third direction is a direction for which the attenuation is substantially equal to 3 dB, the angle formed between the third direction and the first direction being less than 3 degrees.

3. The sonar system of claim 1, wherein the emitting surface is a curved surface.

4. The sonar system of claim 1, wherein the radius of curvature of the emitting surface increases with the distance separating the point considered of the emitting surface from an ideal seabed along a direction perpendicular to the ideal seabed.

5. The sonar system of claim 1, wherein the curve formed by the emitting surface in a sectional plane of the antenna perpendicular to the longitudinal axis is formed by a single transducer.

6. The sonar system of claim 1, wherein the pointing of said emission antenna is offset in terms of a bearing.

7. The sonar system of claim 1, comprising a carrier, the emission antenna being installed on the carrier.

8. The sonar system of claim 1, wherein the emission antenna is arranged in such a way that the emitting surface extends longitudinally along an axis parallel to the direction of displacement of the carrier.

9. The sonar system of claim 8, comprising two emission antennas fixed to port and to starboard of the carrier.

10. The sonar system of claim 1, wherein the first direction is the direction of maximum range of the sonar system and the second direction is the direction of minimum range of the sonar system.

11. The sonar system of claim 1, wherein the profile is constant along the whole length of the emitting surface.

12. A sonar system to image the seabed, the sonar system comprising:
at least one emission antenna to emit an acoustic beam directed toward the seabed covering a useful angular sector starting from the antenna and delimited by a first direction and a first direction inclined with respect to the horizontal and the vertical, the first direction forming a smaller angle with the horizontal than an angle formed between the second direction and the horizontal, wherein the emission antenna is configured to form an emission pattern with energy emitted by the emission antenna in each direction of the useful ideal sector, and the emitted energy decreases from the first direction to the second direction, wherein a portion of the useful angular sector is delimited by the second direction and a third direction lying between the first direction and the second direction, an ideal emission pattern comprising, in each direction of the portion of the useful angular sector, an ideal attenuation DE of $$DE(\theta) = 40\log\left(\frac{\sin\theta_1}{\sin\theta}\right)$$

where $\theta$ is an angle formed between the direction and the horizontal and $\theta_1$ is the first angle, wherein the emission antenna comprises an emitting surface forming a curve in a sectional plane of the antenna perpendicular to the longitudinal axis, said curve being formed by a plurality of transducers, said emission antenna further comprises a power feed device feeding the respective transducers with one and the same signal imbued with respective phase shifts and/or amplitude modulation such that the emission pattern of the antenna in each direction $\theta$ of the portion of the useful angular sector exhibits an energy attenuation with respect to energy emitted along the first direction which is equal or superior to the ideal attenuation, the ideal attenuation being at least 3 dB and at most 15 dB.

13. The sonar system of claim 12, wherein the third direction is a direction for which the attenuation is substantially equal to 3 dB, the angle formed between the third direction and the first direction being less than 3 degrees.

14. The sonar system of claim 12, wherein the emitting surface forms a plane or cylindrical.

15. The sonar system of claim 12, wherein the pointing of said emission antenna is offset in terms of a bearing.

16. The sonar system of claim 12, comprising a carrier, the emission antenna being installed on the carrier.

17. The sonar system of claim 12, wherein the emission antenna is arranged in such a way that the emitting surface extends longitudinally along an axis parallel to the direction of displacement of the carrier.

18. The sonar system of claim 12, comprising two emission antennas fixed to port and to starboard of the carrier.

19. The sonar system of claim 12, wherein the first direction is the direction of maximum range of the sonar system and the second direction is the direction of minimum range of the sonar system.

* * * * *